US007403307B2

(12) United States Patent
Huang et al.

(10) Patent No.: US 7,403,307 B2
(45) Date of Patent: Jul. 22, 2008

(54) METHOD OF SELECTING INKS FOR USE IN IMAGING WITH AN IMAGING APPARATUS

(75) Inventors: Xuan-Chao Huang, Lexington, KY (US); Brant Dennis Nystrom, Lexington, KY (US); Richard Lee Reel, Georgetown, KY (US); Jamee Casteel Holiway, Shelbyville, KY (US)

(73) Assignee: Lexmark International, Inc., Lexington, KY (US)

( * ) Notice: Subject to any disclaimer, the term of this patent is extended or adjusted under 35 U.S.C. 154(b) by 660 days.

(21) Appl. No.: 10/983,831

(22) Filed: Nov. 8, 2004

(65) Prior Publication Data

US 2006/0098039 A1 May 11, 2006

(51) Int. Cl.

*G06K 1/00* (2006.01)
*G06K 15/00* (2006.01)
*B41J 29/393* (2006.01)
*B41J 2/21* (2006.01)
*G01D 15/16* (2006.01)

(52) U.S. Cl. ....................... 358/1.9; 358/3.23; 358/518; 358/523; 347/19; 347/43; 347/100; 347/184

(58) Field of Classification Search ................. 358/1.9, 358/518, 525, 504, 520, 515, 517, 3.23, 523; 347/43, 40, 100, 19, 116, 234, 184; 382/162, 382/167

See application file for complete search history.

(56) References Cited

U.S. PATENT DOCUMENTS 6,072,464 A * 6/2000 Ozeki ......................... 345/603
6,115,138 A * 9/2000 Yanaka ....................... 358/1.9
6,172,692 B1 * 1/2001 Huang et al. .................. 347/43
6,290,762 B1 * 9/2001 Elwakil .................. 106/31.27
6,336,705 B1 1/2002 Torigoe
6,381,036 B1 * 4/2002 Olson ......................... 358/1.9
6,464,334 B2 10/2002 Lopez et al.
6,540,329 B1 4/2003 Kaneko et al.
2002/0039118 A1 4/2002 Shibata
2003/0030695 A1 2/2003 Doll et al.
2003/0090726 A1 5/2003 Arai
2003/0098986 A1 5/2003 Pop
2003/0142151 A1 7/2003 Yashima et al.
2003/0151756 A1 8/2003 Yamazaki et al.
2003/0189613 A1 10/2003 Mahy
2003/0193677 A1 10/2003 Zeng
2003/0210414 A1 11/2003 Kuno
2005/0094871 A1 * 5/2005 Berns et al. ................. 382/162

* cited by examiner

*Primary Examiner*—Mark Zimmerman
*Assistant Examiner*—Charlotte M Baker
(74) *Attorney, Agent, or Firm*—Taylor & Aust PC

(57) ABSTRACT

A method of selecting inks for use in imaging with an imaging apparatus includes determining a maximum usage of a diluted ink for use in conjunction with a saturated ink based on visual perception characteristics relating to a combination of the diluted ink and the saturated ink; generating an initial colorant space based on the maximum usage of the diluted ink, the initial colorant space expressing an initial usage of the diluted ink and an initial usage of the saturated ink at each point in the initial colorant space; optimizing the initial usage of the diluted ink and the initial usage of the saturated ink in the initial colorant space to generate a final usage of the diluted ink and a final usage of the saturated ink in a final colorant space; and generating a color conversion lookup table based on the final colorant space.

19 Claims, 11 Drawing Sheets

METHOD OF SELECTING INKS FOR USE IN IMAGING WITH AN IMAGING APPARATUS

BACKGROUND OF THE INVENTION

1. Field of the Invention

The present invention relates to printing, and, more particularly, to a method of selecting inks for use in imaging with an imaging apparatus.

2. Description of the Related Art

In recent years many inkjet printers with multilevel color inks, sometimes referred to as "photo printers," have been developed for home and office use. These printers typically perform six-color printing, and employ saturated cyan, saturated magenta, saturated yellow, saturated black, diluted cyan, and diluted magenta inks (CMYKcm). The photo printer cartridges are generally organized in such a way that the saturated cyan, magenta, and yellow inks are in one cartridge, referred to as a "color cartridge," and the diluted cyan, diluted magenta, and saturated black are in another cartridge, referred to as a "photo cartridge." The use of diluted inks helps to improve image quality so as to achieve photo-quality images. However, visual artifacts, such as mottling and smearing, are created if the diluted inks are not used appropriately.

The inks in the color and photo cartridges are typically either dye-based or pigment-based inks. The dye-based inks have a larger color gamut than pigment-based inks, but poorer light fastness, especially for the diluted inks, whereas the pigment-based inks have a smaller color gamut but much better light fastness. Light fastness pertains to the ability of a printed image to retain its original colorfulness, without excessive fading over a period of time. In order to provide a large color gamut while providing good light fastness, a hybrid approach has been taken, wherein both dye-based inks and pigment-based inks are employed by the photo printer to render images. Another advantage of using the hybrid approach is that it has good dynamic range of lightness across the range of different types of print media.

However, a problem with the hybrid approach is that the gloss transition between the pigment-based inks and the dye-based inks on glossy paper results in serious visual artifacts. Thus, in order to improve image quality by using the hybrid approach, not only must problems associated with using diluted and saturated inks be resolved, but the problems associated with using both dye-based inks and pigment-based inks must also be resolved so that both diluted and saturated inks in the form of dye-based inks and pigment-based inks may be employed by the photo printer.

What is needed in the art is an improved method of selecting inks for use in imaging with an imaging apparatus.

SUMMARY OF THE INVENTION

The present invention provides an improved method of selecting inks for use in imaging with an imaging apparatus.

The invention, in one form thereof, relates to a method of selecting inks for use in imaging with an imaging apparatus. The method includes determining a maximum usage of a diluted ink for use in conjunction with a saturated ink based on visual perception characteristics relating to a combination of the diluted ink and the saturated ink; generating an initial colorant space based on the maximum usage of the diluted ink, the initial colorant space expressing an initial usage of the diluted ink and an initial usage of the saturated ink at each point in the initial colorant space; optimizing the initial usage of the diluted ink and the initial usage of the saturated ink in the initial colorant space to generate a final usage of the diluted ink and a final usage of the saturated ink in a final colorant space; and generating a color conversion lookup table based on the final colorant space.

The invention, in another form thereof, relates to a method of selecting inks for use in imaging with an imaging apparatus. The method includes printing a plurality of color patches on a substrate using a diluted ink and a saturated ink; determining at least two of granularity, gloss, and a substrate ink tolerance, based on the plurality of color patches; determining a maximum usage of the diluted ink for use in conjunction with the saturated ink based on visual perception characteristics relating to a combination of the diluted ink and the saturated ink, wherein the visual perception characteristics are based on the at least two of the granularity, the gloss, and the substrate ink tolerance; generating an initial colorant space based on the maximum usage of the diluted ink, the initial colorant space expressing an initial usage of the diluted ink and an initial usage of the saturated ink at each point in the initial colorant space; and generating a color conversion lookup table based in part on the initial colorant space.

The invention, in yet another form thereof, relates to a method of selecting inks for use in imaging with an imaging apparatus. The method includes generating an initial colorant space, the initial colorant space expressing an initial usage of the diluted ink and an initial usage of the saturated ink at each point in the initial colorant space; optimizing the initial usage of the diluted ink and the initial usage of the saturated ink in the initial colorant space to generate a final usage of the diluted ink and a final usage of the saturated ink in a final colorant space; and generating a color conversion lookup table based on the final colorant space.

An advantage of the present invention is reducing mottling and smearing in an image.

Another advantage is that paper-cockling and soak-through of the printing substrate may be avoided.

Yet another advantage is the reduction of glossy transition artifacts and increased smoothness of color transitions, while retaining the advantages of the hybrid approach of using dye-based and pigment-based inks, such as large color gamut, improved light fastness, and good dynamic range of lightness across a range of different print media.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
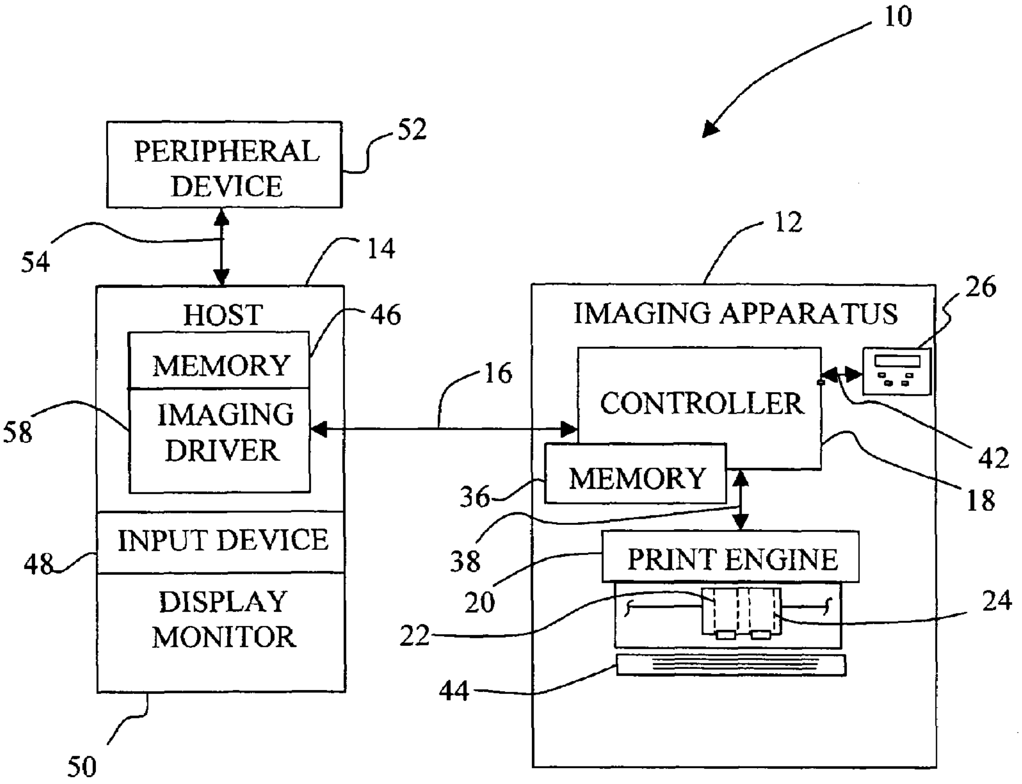
FIG. 1 is a diagrammatic depiction of an imaging system that employs an imaging apparatus in accordance with the present invention.

Referring now to the drawings, and particularly to FIG. 1, there is shown a diagrammatic depiction of an imaging system 10 embodying the present invention. Imaging system 10 includes an imaging apparatus 12 and a host 14. Imaging apparatus 12 communicates with host 14 via a communications link 16.

Imaging apparatus 12 may be, for example, an ink jet printer and/or copier, or an all-in-one (AIO) unit that includes an inkjet printer, a scanner, and possibly a fax unit. In the present embodiment, imaging apparatus 12 includes a controller 18, a print engine 20, a color printing cartridge 22, a photo printing cartridge 24, and a user interface 26.

Controller 18 includes a processor unit and associated memory 36, and may be formed as one or more Application Specific Integrated Circuits (ASIC). Controller 18 is a printer controller, but may alternatively be a scanner controller, or combined printer and scanner controller. Although controller 18 is depicted in imaging apparatus 12, alternatively, it is contemplated that all or a portion of controller 18 may reside in host 14. Controller 18 is communicatively coupled to print engine 20 via a communications link 38, and to user interface 26 via a communications link 42. Controller 18 serves to process print data and to operate print engine 20 to perform printing.

Print engine 20 is configured to mount one or more of color printing cartridge 22 and one or more of photo printing cartridge 24 and to print on a substrate 44 using color printing cartridge 22 and photo printing cartridge 24. Print engine 20 is capable of printing with multilevel hybrid inks including a diluted ink and a saturated ink, wherein the diluted ink is one of a pigment-based ink and a dye-based ink, and the saturated ink is the other of the pigment-based ink and the dye-based ink. As set forth below, in the present embodiment, the saturated inks employed by imaging apparatus 12 are dye-based, and the diluted inks are pigment-based. Alternatively, however, it is contemplated that each saturated ink and diluted ink may be dye-based or pigment based, wherein some saturated inks are dye-based, while others are pigment-based, and wherein some diluted inks are pigment based, while others are dye-based.

Color printing cartridge 22 is capable of printing various colors of ink, such as saturated cyan (C), saturated magenta (M), and saturated yellow (Y) dye-based inks. The term, "saturated" refers to the fact that the inks are full-strength such as the inks used by conventional CMYK ink jet printers, and are not, for example, diluted inks. Color printing cartridge 22 is also capable of printing at least two drop sizes, or drop masses, of ink, including a large drop mass and a small drop mass.

Photo printing cartridge 24 is capable of printing saturated black (K), diluted cyan (c), and diluted magenta (m) inks, as well as printing at least two drop sizes, or drop masses, of ink, including a large drop mass and a small drop mass. The diluted cyan and diluted magenta inks printed by photo printing cartridge 24 are pigment based, and the black ink printed by photo printing cartridge 24 is also a pigment-based ink.

Imaging apparatus 12, as an ink jet printer, is configured to print using CMY inks in color printing cartridge 22 and Kcm inks in photo printing cartridge 24.

Accordingly, when printing using color printing cartridge 22 and photo printing cartridge 24, print engine 20 performs six-color printing, wherein the six colors are cyan, magenta, yellow, black, diluted cyan, and diluted magenta (CMYKcm). The combination of dye-based inks and pigment-based inks is referred to as hybrid inks. In addition, the cyan and magenta inks may be referred to as multilevel inks, based on the fact that there are more than one "level" associated with each ink color that may be printed using print engine 20: saturated, diluted, as well as levels associated with drop size/mass. Although reference is made herein to saturated and diluted inks, it will be understood by those skilled in the art that the use of more than two different ink concentrations may be employed without departing from the scope of the present invention.

Substrate 44 is a print medium, and may be one of many types of print media, such as a sheet of plain paper, fabric, photo paper, coated ink jet paper, greeting card stock, transparency stock for use with overhead projectors, iron-on transfer material for use in transferring an image to an article of clothing, and back-lit film for use in creating advertisement displays and the like. As an ink jet print engine, print engine 20 operates color printing cartridge 22 and photo printing cartridge 24 to eject ink droplets onto substrate 44 in order to reproduce text or images, etc.

Host 14 may be, for example, a personal computer, including memory 46, an input device 48, such as a keyboard, and a display monitor 50. A peripheral device 52, such as a digital camera, is coupled to host 14 via a communication link 54. Host 14 further includes a processor, input/output (I/O) interfaces, memory, such as RAM, ROM, NVRAM, and at least one mass data storage device, such as a hard drive, a CD-ROM and/or a DVD unit.

During operation, host 14 includes in its memory a software program including program instructions that function as an imaging driver 58, e.g., printer/scanner driver software, for imaging apparatus 12. Imaging driver 58 is in communication with controller 18 of imaging apparatus 12 via communications link 16. Imaging driver 58 facilitates communication between imaging apparatus 12 and host 14, and may provide formatted print data to imaging apparatus 12, and more particularly, to print engine 20. Although imaging driver 58 is disclosed as residing in memory 46 of host 14, it is contemplated that, alternatively, all or a portion of imaging driver 58 may be located in controller 18 of imaging apparatus 12, for example, in memory 36 or a firmware component of controller 18.

Figure 2:
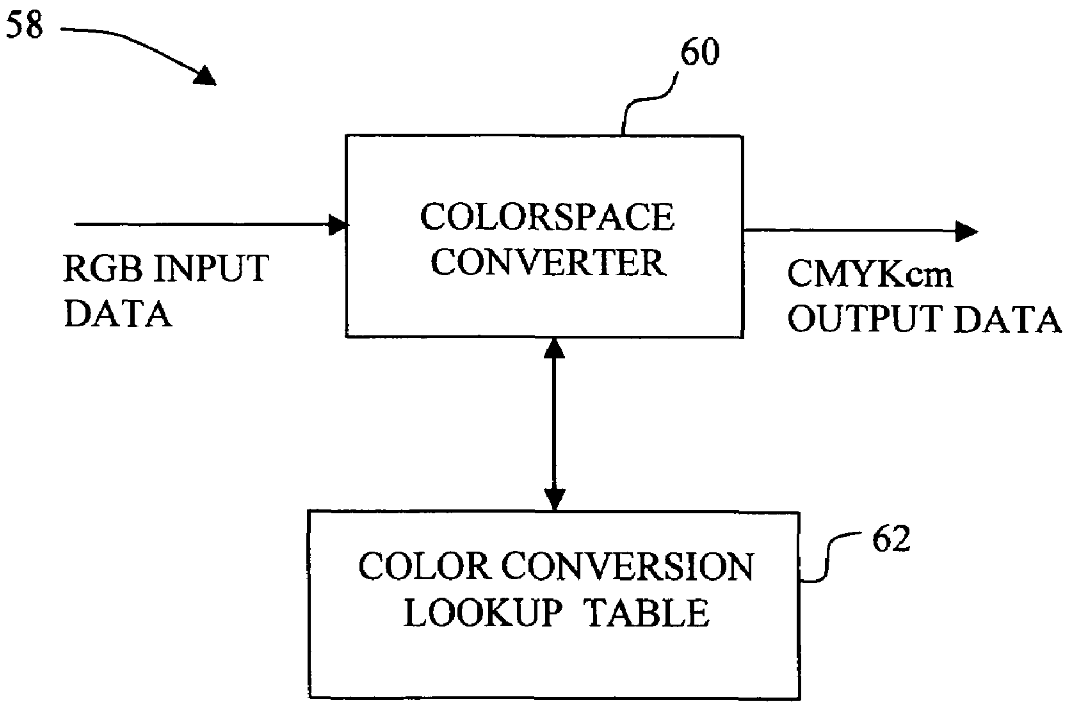
FIG. 2 is a diagrammatic depiction of a colorspace converter accessing a color conversion lookup table in accordance with the embodiment of FIG. 1.

Referring now to FIG. 2, imaging driver 58 includes a colorspace converter 60. Although described herein as residing in imaging driver 58, colorspace converter 60 may be in the form of firmware or software, and may reside in either imaging driver 58 or controller 18. Alternatively, some portions of colorspace converter 60 may reside in imaging driver 58, while other portions reside in controller 18.

Coupled to colorspace converter 60 is a color conversion lookup table 62. Colorspace converter 60 converts color signals from an RGB colorspace output by display monitor 50 to an output colorspace using color conversion lookup table 62. For example, the output colorspace may be CMYKcm. Color conversion lookup table 62 is a multidimensional lookup table having at least three dimensions, and includes RGB input values and the corresponding CMYKcm output values. Color conversion lookup table 62 may also include other data, such as spectral data.

Color conversion lookup table 62 may be in the form of groups of polynomial functions capable of providing the same multidimensional output as if in the form of a lookup table. As shown in FIG. 2, for example, colorspace converter 60 converts input RBG color data into CMYKcm output data, using color conversion lookup table 62.

Figure 3:
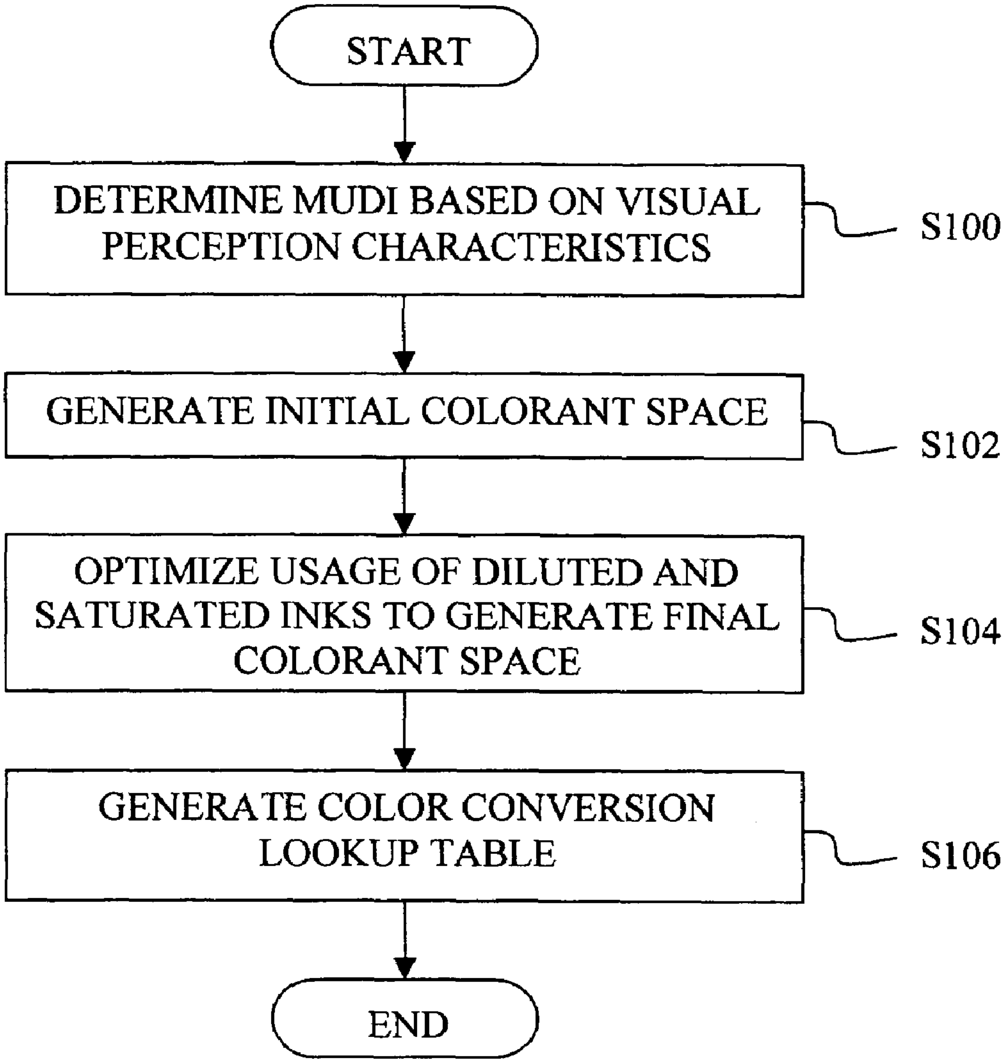
FIG. 3 is a flowchart that generally depicts an embodiment of a method in accordance with the present invention.

Referring now to FIG. 3, a method of selecting inks for use in imaging with imaging apparatus 12 is depicted.

At step S100, a maximum usage of diluted ink (MUDI), e.g., for diluted cyan ink and for diluted magenta ink, for use in conjunction with saturated ink, e.g., cyan, magenta, and/or yellow saturated inks, is determined based on visual perception characteristics relating to a combination of diluted ink and said saturated ink. Visual perception characteristics may include, for example, lightness, granularity, gloss, and substrate ink tolerance. Step S100 is described in greater detail below with respect to FIGS. 4 and 5, and steps S100-1 to S100-7.

At step S102, an initial colorant space is generated based on the maximum usage of diluted ink. As will be appreciated by those skilled in the art, a colorant space includes many colorant points, each of which expresses a value pertaining to a quantity of ink for each color of ink accounted for in the colorant space, for example, 8-bit color values in the range of 0 to 255 for each of cyan, magenta, yellow, black, diluted cyan, and diluted magenta. The initial colorant space expresses an initial usage of the diluted ink and an initial usage of the saturated ink at each point in the initial colorant space. Step S102 is described in greater detail below with respect to FIGS. 6-11, and steps S102-1 to S102-9.

At step S104, the initial usage of diluted ink and the initial usage of saturated ink in the initial colorant space is optimized to generate a final usage of diluted ink and a final usage of saturated ink in a final colorant space. Step S104 is described in greater detail below with respect to FIGS. 12, 13A, and 13B, and steps S104-1 to S104-7.

At step S106, color conversion lookup table 62 is generated based on the final colorant space. Step S106 is described in greater detail below with respect to FIG. 14 and steps S106-1 to S106-11.

Figure 4:
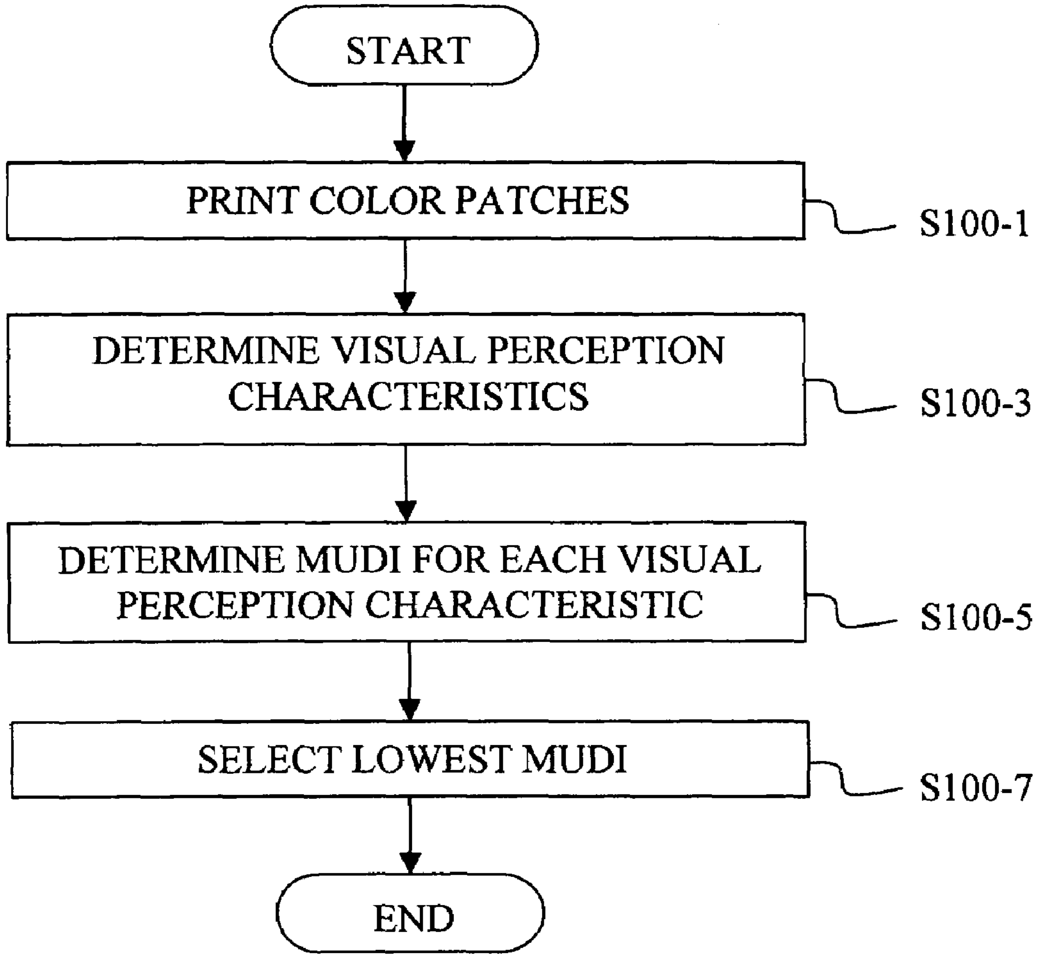
FIG. 4 is a flowchart that depicts a method of determining a maximum usage of diluted ink (MUDI) in accordance with the embodiment of FIG. 3.

Referring now to FIG. 4, the determination of the MUDI based on visual perception characteristics, as set forth in step S100 of FIG. 3, is described in greater detail below with respect to steps S100-1 to S100-7.

The objective of multilevel ink printing is to achieve photographic quality by reducing the image graininess. Within a certain range from a light to a dark image area, the use of diluted ink may be used to reduce the image graininess. However, as set forth above, the diluted cyan and magenta inks are pigment-based inks, whereas the saturated cyan, magenta, and yellow inks are dye-based inks. Too much diluted ink may result in visual artifacts, such as an unacceptable glossy transition from the diluted pigment-based inks to the saturated dye inks at certain darker portions of the image, i.e., darker image areas. This is caused by the difference in gloss between printing with pigment-based inks and dye-based inks.

In addition, without regard to the effect on gloss by using different inks, too much use of the diluted inks may result in too much water on the paper, which leads to other serious visual artifacts, such as mottling of the image, smearing of the ink, and the soaking of ink through substrate 44, which is referred to as soak-thru. In addition, paper-cockling may occur in substrate 44. Such artifacts are related to the use of multilevel inks, and to the amount of ink that can be tolerated by substrate 44. For example, inherent in the use of multilevel inks is that the amount of water ejected onto the paper increases beyond that of single level inks due to the use of diluted inks. Many substrates cannot quickly or completely absorb all the ink, resulting in the aforementioned visual artifacts. Some substrates may be able to absorb higher amounts of ink during low-speed printing, e.g., wherein there is enough time to absorb the ink, but when used in higher speed printing, mottling occurs due to the inability to quickly absorb all of the different colors of ink being ejected onto the substrate.

In order to reduce the likelihood of such visual artifacts, while maintaining the advantage of dilute inks in reducing image graininess, and while allowing higher speed printing, measurements of lightness, granularity, and gloss, and substrate ink tolerance are recommended, wherein the amount of usage of diluted inks to be used in printing is determined based on these measurements.

At step S100-1, a plurality of color patches is printed on substrate 44 using the cyan and magenta diluted inks, and using the cyan, magenta, and yellow saturated inks. The color patches are selected as follows.

For each level of ink (e.g., diluted or saturated), n evenly spaced points covering the whole digital range, e.g., 0 to 255 for eight bit color, are selected. For multilevel ink (e.g. cyan or magenta), all combinations of the n-point diluted and n-point saturated inks are used to print n×n patches. For single level ink (e.g. yellow), n points are used to print n patches. Acceptable results were obtained by the inventors using n=9.

At step S100-3, lightness, granularity, gloss, and a substrate ink tolerance are determined based on the plurality of color patches. The visual perception characteristics of step S100 are determined based on at least one of granularity, gloss, and substrate ink tolerance. In a preferred embodiment, the visual perception characteristics are based on each of granularity, gloss, and substrate ink tolerance. For example, granularity, gloss, and substrate ink tolerance are measured for each printed patch. In addition, the lightness (L* in the CIELAB colorspace system) of each patch is measured using a spectrophotometer.

The granularity may be measured with a granularity meter. If a granularity meter is not available, a visual examination score for the granularity (0-100, with 100 being the most granularity) is given to each of the patches.

The gloss at 60 degrees is measured with a gloss meter.

The substrate ink tolerance is determined by examining the printed patches. For example, if ink soak-thru is observed, the substrate ink tolerance has been exceeded. Knowing the amount of ink that was used to generate each color patch, for example, based on the digital counts input into print engine 20 by controller 18 for printing the color patches, allows a determination of how much ink resulted in soak through of substrate 44, and hence, allows a determination of substrate ink tolerance.

At step S100-5, the maximum usage of diluted ink (MUDI) is determined for each visual perception characteristic, e.g., granularity, gloss, and substrate ink tolerance.

The theoretical upper limit of the maximum usage of diluted ink is 100% diluted ink (digital count=255 for 8-bit data). However, in practice, the maximum usage of diluted ink at any given color point may be less than 100% so that visual perception characteristics, e.g., the granularity improvement limit, gloss difference and gloss transition from diluted pigment ink to saturated dye ink, or mottling, smearing, and soak-through that are associated with the substrate ink tolerance, will be within acceptable limits.

The MUDI based on the granularity improvement limit is the minimum diluted ink usage at which increasing usage of diluted ink will not significantly improve the granularity. This can be determined by examining the granularity values from light to dark patches.

Figure 5:
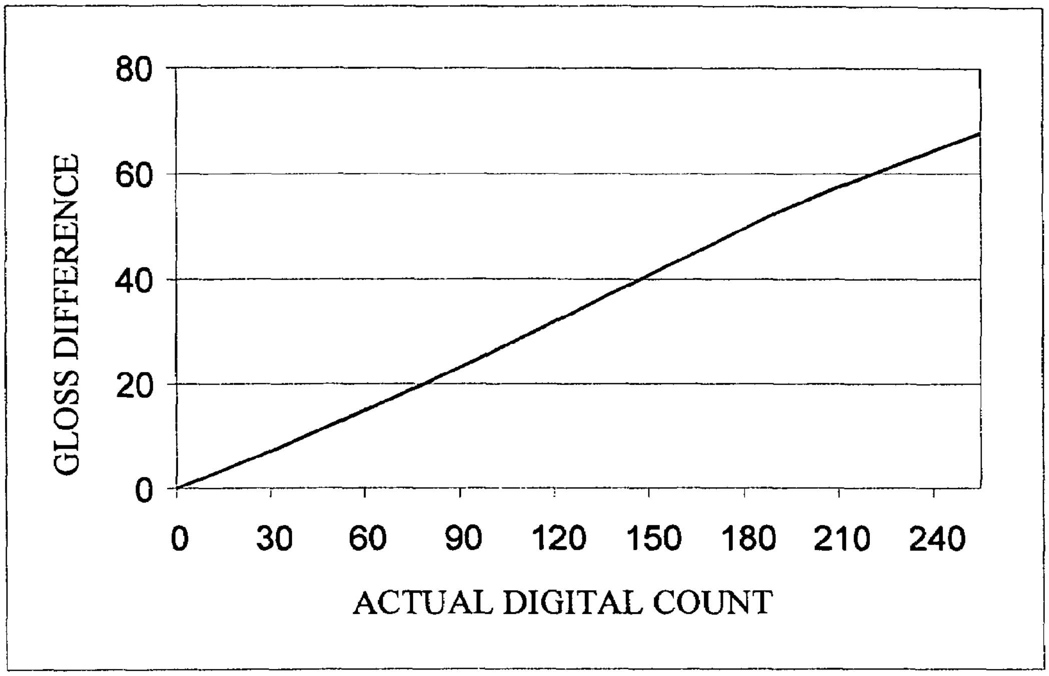
FIG. 5 is a plot depicting a gloss difference (color patch gloss minus substrate gloss) characteristic of diluted cyan ink.

Referring now to FIG. 5, the MUDI based on gloss is determined by gloss measurements. FIG. 5 illustrates the gloss difference values (color patch gloss minus substrate gloss) changing with the diluted ink usage for diluted cyan ink. It can be seen that the gloss difference value increases with the usage of the diluted ink. The acceptable gloss difference value is determined by visual examination of the printed patches and/or experience. One way to gain the experience is that several gloss difference values are first chosen based on the printed patches, then for each selected gloss difference value (corresponding to a MUDI) the remaining process is completed and a color reproduction table is built to print representative images, with emphasis on the transition from diluted pigment ink to saturated dye ink within the image. Finally an acceptable gloss difference value, and hence a corresponding MUDI, is determined based on the comparison of the printed images.

The MUDI based on substrate ink tolerance is determined by examining the printed patches. The maximum diluted ink should be decreased if smearing or show-through (soak-thru) occurs due to an excessive amount of diluted ink.

Referring again to FIG. 4, at step S100-7, the lowest maximum usage of diluted ink is selected from the group of MUDI's individually determined in step S100-5 based on each of granularity, gloss, and substrate ink tolerance, for example, the lowest of the MUDI's calculated for each of granularity, gloss, and substrate ink tolerance.

Figure 6:
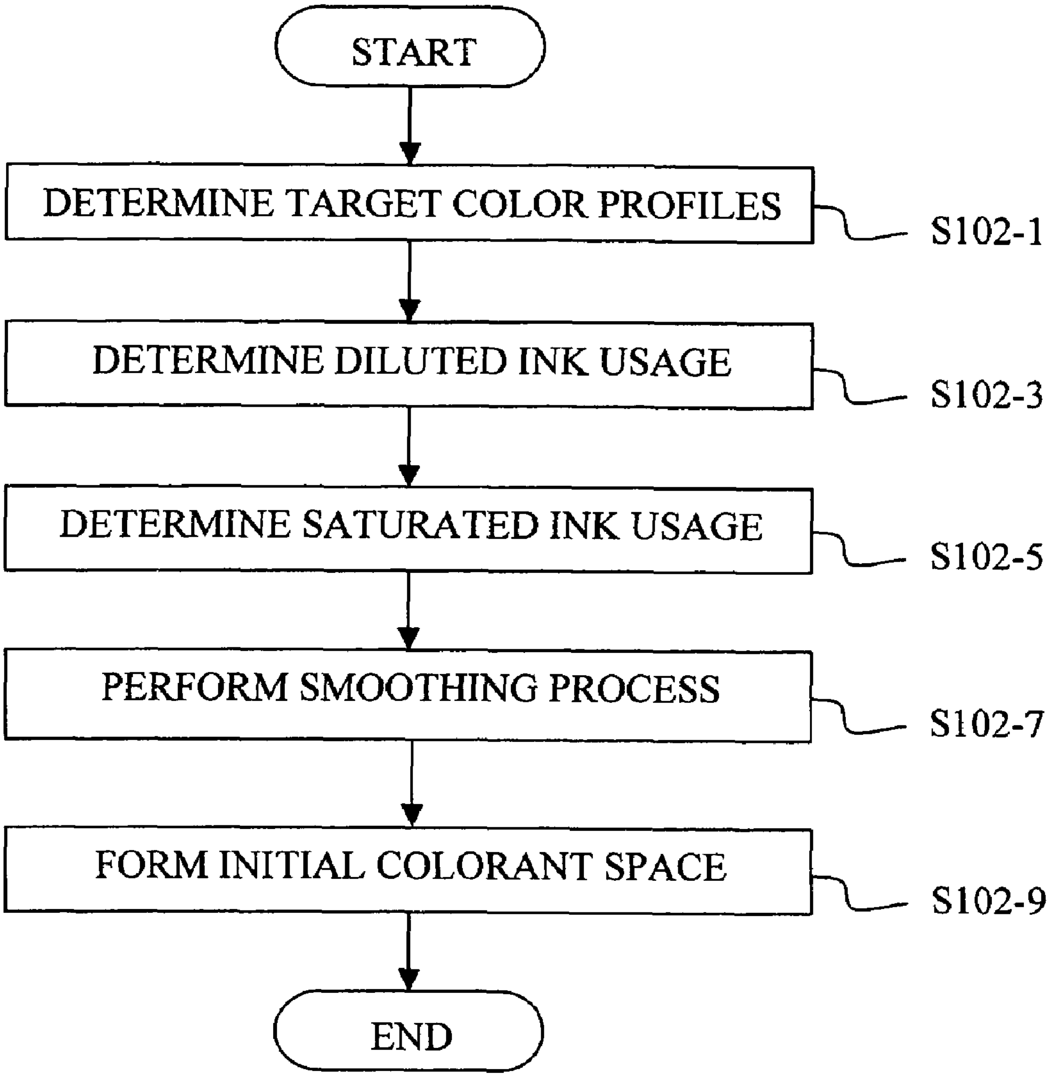
FIG. 6 is a flowchart that depicts a method of generating an initial colorant space based on a maximum usage of diluted ink in accordance with the embodiment of FIG. 3.

Referring now to FIG. 6, the generation of the initial colorant space based on the maximum usage of diluted ink, as set forth in step S102 of FIG. 3, is described in greater detail below with respect to steps S102-1 to S102-9.

The general rule for multilevel ink mixing is that the diluted ink is used primarily to reproduce light colors and the saturated ink is used primarily to reproduce dark colors. Both the diluted and saturated inks may be used for middle-tone colors. Mixing tables, also referred to herein as 1-D lookup tables, are generated to determine both the initial usage of the diluted ink and the initial usage of the saturated ink based on the maximum usage of the diluted ink, as set forth below. The initial colorant space is generated based on the initial usage of diluted ink and the initial usage of saturated ink. The term, "mixing," as employed herein, does not refer to a physical mixing of different inks, e.g., diluted and saturated inks, as would yield a mixture of those inks into, for example, a common reservoir, but rather, refers to selecting an amount of each ink for placement on substrate 44 at a given pixel in order to reproduce the desired color.

The initial usage of the diluted ink and the initial usage of the saturated ink refer to the amounts of the diluted ink and the saturated ink, respectively, that are expressed by a digital count in the initial colorant space for each point in that colorant space. For example, a colorant point (120, 125, 130, 60, 25, 30) in a CMYKcm initial colorant space represents a particular color point having a digital count (based on the input tone) for saturated cyan of 120, and digital counts for saturated magenta, saturated yellow, black, diluted cyan, and diluted magenta of 125, 130, 60, 25, and 30, respectively, that would otherwise be input to a halftoner (not shown) for possible printing of a pixel. In the present embodiment, however, colorant points from the initial colorant space may not be printed directly; rather, as set forth above in step S104 of FIG. 3, the usage of diluted and saturated inks is optimized to generate a final usage of diluted ink and a final usage of saturated ink in a final colorant space, which is then used to create color conversion lookup table 62 for printing. Hence, it is the digital counts of the final colorant space that are input to the halftoner for printing.

At step S102-1, target color profiles are determined for each primary color ink, e.g., cyan, magenta, and yellow.

Figure 7:
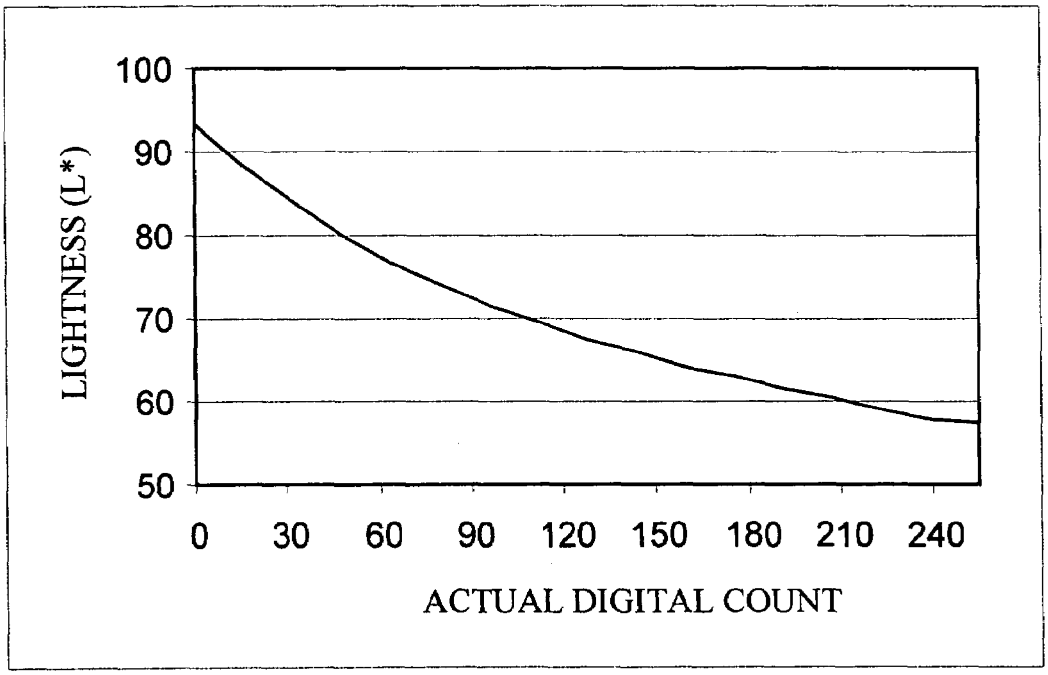
FIG. 7 is a plot depicting the change of lightness (L*) with actual digital count for cyan.

Referring now to FIG. 7, the change of lightness (L*) with the actual digital count ($C_0$) of cyan is depicted. The actual digital count generally represents the value sent to imaging apparatus 12 for printing a particular ink at a particular pixel. The paper white is at digital count=0, and the solid color (darkest cyan color) is at digital count=255 (maximum value for 8-bit representation). It is shown in FIG. 7 that the change of lightness with the actual digital count is non-linear. Since a more linearized color space would result in less interpolation errors in later processing, a digital count lookup table, wherein the table index (abscissa) is a nominal digital count ($x_0$) and the table content (ordinate) is the actual digital count ($C_0$), is constructed in such a way that when the nominal digital count changes from 0 to 255, the actual digital count ($C_0$) changes non-linearly from 0 to 255, whereas the lightness (L*) changes linearly from the white point to the darkest point.

Figure 8:
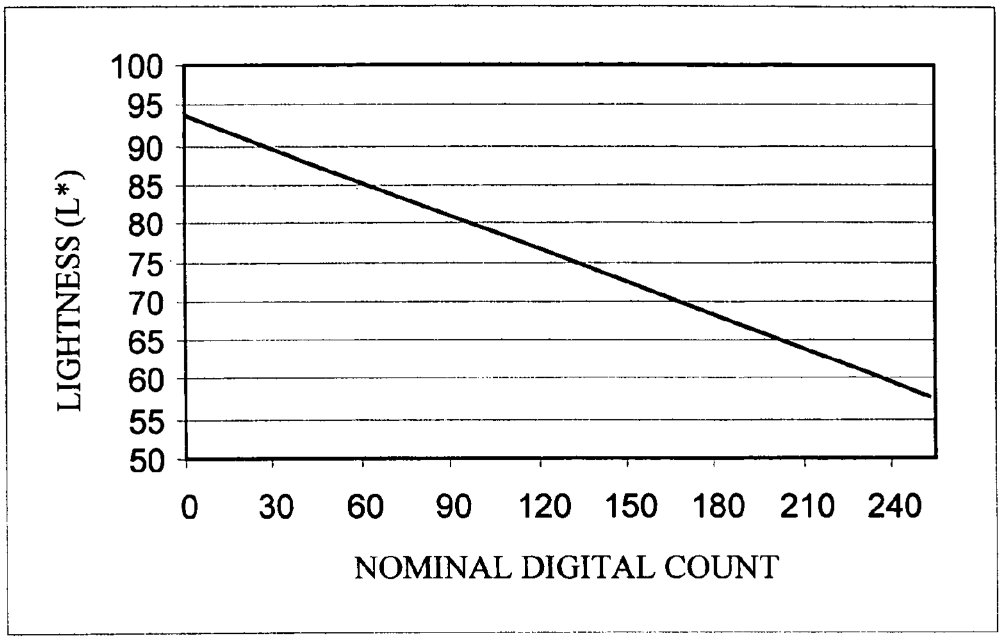
FIG. 8 is a plot depicting a target color profile for cyan.

Referring now to FIG. 8, a linearized lightness profile is defined with respect to the nominal digital count ($x_0$) as the "target color profile." To determine the target color profile, only the lightness (L*) of paper (substrate 44) white and that of the darkest (solid) color as printed on substrate 44 are required.

For the target color profile of multilevel ink, it is necessary to know which levels of the ink can be printed on the darkest color. This may vary from one printing system to another. The general rule is that the diluted ink will not be printed at the darkest color and only saturated ink will be printed at the darkest color.

Figure 9:
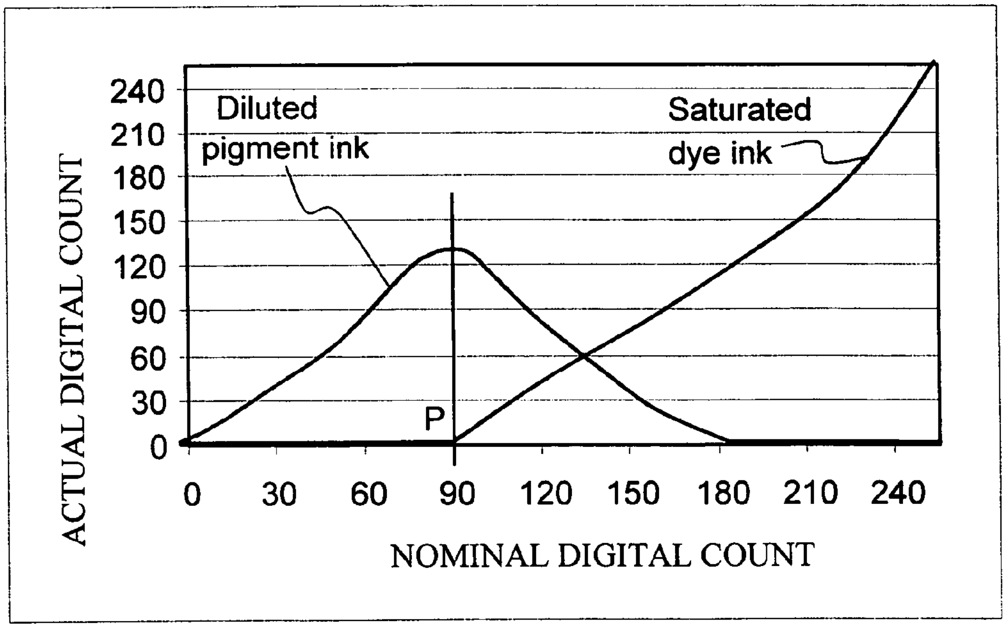
FIG. 9 is a plot depicting a cyan mixing table.

Referring now to FIGS. 6 and 9, at step S102-3, initial usage of the diluted ink is determined.

The objective of mixing different printing levels is, for a given target color profile index (nominal digital count $x_{0i}$), to find an appropriate combination of the levels (e.g., diluted and saturated levels) to produce the desired lightness (L*) at the index. For example, with reference to FIG. 9, the following procedures are used in the present embodiment to determine the initial usage of diluted ink, after which, the initial usage of the saturated ink is determined.

(a) Initially, set all mixing tables to zeros.

(b) Select the diluted ink, which represents a level of multilevel ink, and start from the white point (index=0) in the target color profile.

(c) Increase the target color profile index by 1 and find the target L*.

(d) Change only the currently-selected level's actual digital count and keep the other levels' actual digital counts unchanged. Use an interpolation scheme and all levels' actual digital counts at the current target index to compute the lightness value until matching the target L*. Put the matched actual digital count in the current level's lookup table.

(e) Continue steps (c) and (d) until the matched actual digital count reaches the maximum usage of diluted ink (MUDI) determined at step S100 of FIG. 3. The plotted data left of the vertical line in FIG. 9 is the mixing result obtained so far for the diluted ink. Record the current target profile index (corresponding to the peak) as the peak index (P in FIG. 9).

(f) Flip (mirror) the plotted data to the right side of the vertical line at the peak index P. If the flipped part is beyond the maximum index (255), it may be linearly scaled to the maximum index. This completes the process of mixing the diluted ink.

At step S102-5, initial usage of saturated ink is determined.

(a) Select the saturated ink and start from the last peak index P in the target color profile obtained above (for a single-level ink like yellow, the last peak index will be zero).

(b) Increase the target color profile index by 1 and find the target L*.

(c) Change only the currently-selected level's actual digital count and keep other levels' actual digital counts unchanged. Use an interpolation scheme and all levels' actual digital counts at the current target index to compute the lightness value until matching the target L*. Put the matched actual digital count in the current level's lookup table.

(d) Continue steps (b) and (c) until the matched actual digital count reaching the maximum value (255). This completes the process of mixing the saturated ink.

Referring again to FIG. 6, at step S102-7 a smoothing process is performed on the mixing tables. Since the mixing tables are determined based on measurement data, noise in the measurement data is propagated into the mixing table. In the present embodiment, a running-average scheme is employed to smooth the mixing tables. A run-length of 11 points was found suitable for this purpose. That is, for each point in the table of each printing level, the original point is replaced with the average of the left 5 points, itself, and the right 5 points.

Figure 10:
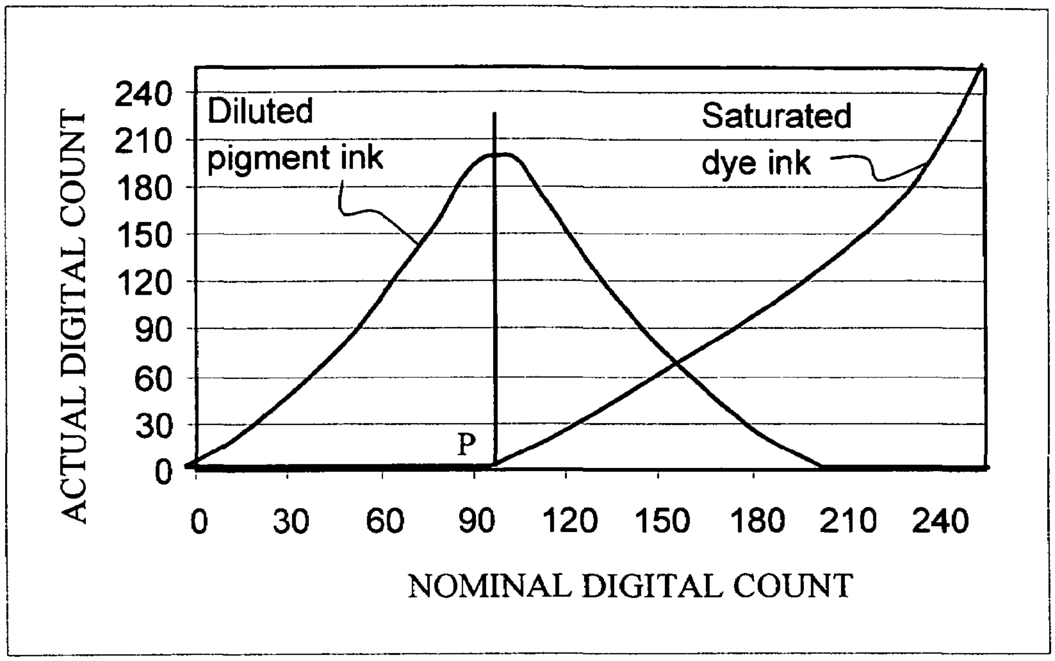
FIG. 10 is a plot depicting a magenta mixing table.
Figure 11:
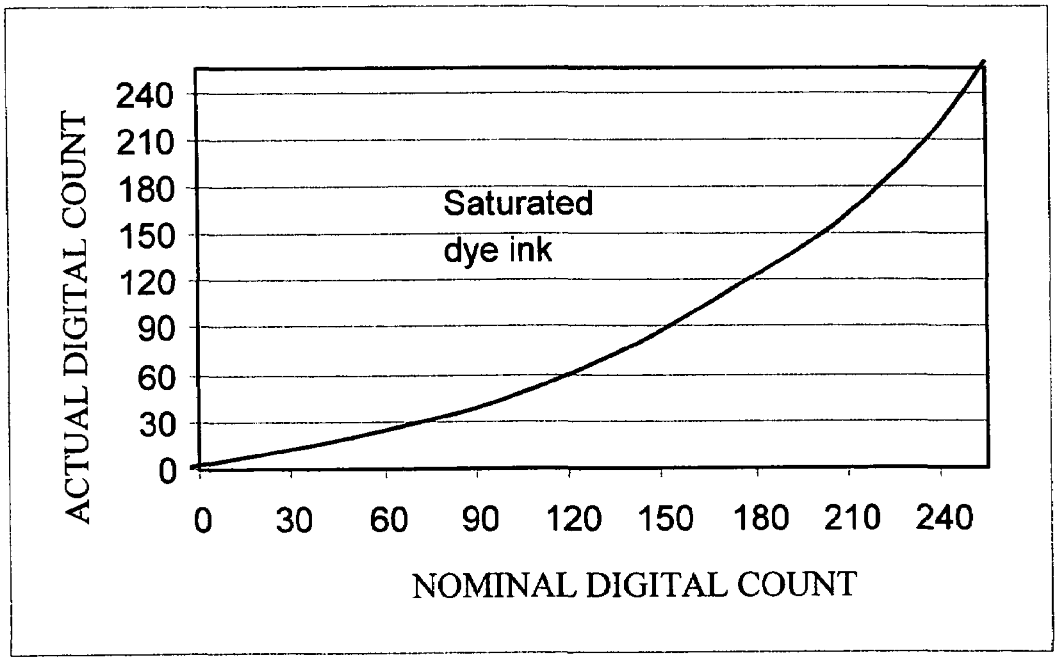
FIG. 11 is a plot depicting a yellow mixing table.

FIGS. 9-11 depict the smoothed mixing tables for cyan, magenta, and yellow, respectively.

At step S102-9, the initial colorant space is formed, based on initial usage of diluted ink and the initial usage of the saturated ink. For example, the above procedures (steps S102-1 to S102-7) have produced one dimensional (1-D) lookup tables along cyan, magenta, and yellow nominal digital count axes. The three nominal axes will form a 3-D cube including 16 million (256×256×256) color mixing points. At each mixing point, there exist 5 digital counts: $C_0$ (saturated cyan), $M_0$ (saturated magenta), $Y_0$ (saturated yellow), $c_0$ (diluted cyan), and $m_0$ (diluted magenta). This space is referred to as the initial colorant space. The cyan, magenta, and yellow nominal digital count axes are denoted as $x_0$, $x_1$, $x_2$ respectively. A coordinate of a mixing point in this space is denoted by ($x_0$, $x_1$, $x_2$) at which there exists 5 digital counts: ($C_0$, $M_0$, $Y_0$, $c_0$, $m_0$).

Figure 12:
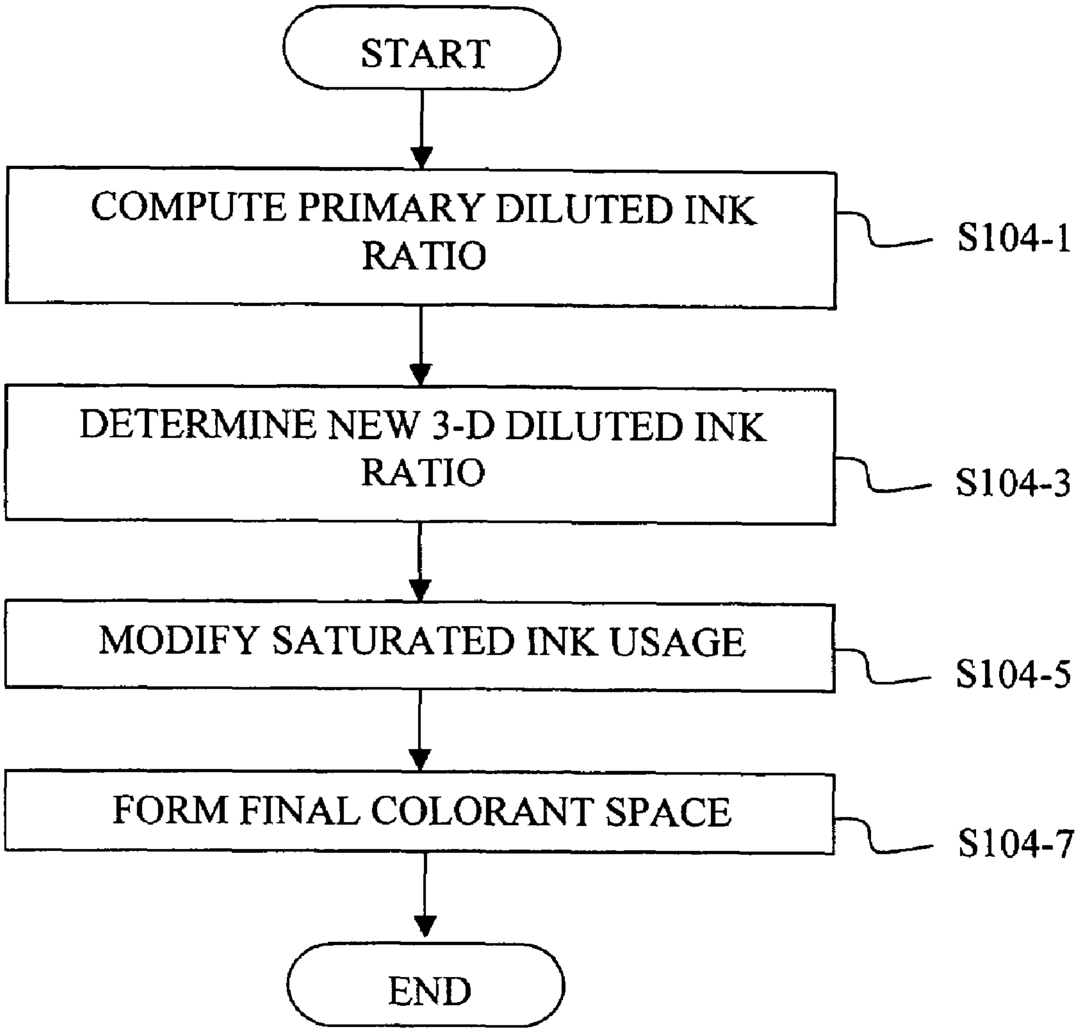
FIG. 12 is a flowchart that depicts a method of optimizing the usage of diluted and saturated inks in accordance with the embodiment of FIG. 3.

Referring now to FIG. 12, the optimization of the initial usage of diluted ink and the initial usage of saturated ink in the initial colorant space to generate the final usage of diluted ink and the final usage of saturated ink in the final colorant space, as set forth in step S104 of FIG. 3, is described in greater detail below with respect to steps S104-1 to S104-7.

The main purpose of using diluted inks is to minimize the graininess of light and middle-tone color images. The darker color images should not use diluted inks for two reasons: (1) no significant graininess improvements can be achieved by using the diluted inks; and (2) too much ink on the paper (substrate 44) will cause smearing, soak-thru, and paper cockles, resulting in a loss of aesthetic appeal of the printed images. However, the initial colorant space contains subsets of unnecessary diluted inks. For example, a color mixing point (255, 0, 255, 0, 255) (100% saturated cyan mixed with 100% yellow and 100% diluted magenta) exists in the initial colorant space. Such a colorant point is not appropriate, because mixing 100% saturated cyan with 100% yellow results in a very saturated color, and further mixing with any diluted ink not only yields no improvement in graininess, but also results in too much water (from the ink) being ejected onto the paper. This problem may be solved by the following optimization procedures.

At step S1104-1, a primary diluted ink ratio is computed.

When generating the 1-D lookup tables (mixing tables), a preferred strategy is how to determine how much diluted ink should be used at each mixing point along the primary ink axis, since the diluted ink usage will determine the image graininess and smoothness of color transition. The ratio of the diluted ink at each color mixing point along the primary ink axis (x) is referred to as the Primary Diluted Ink Ratio, and is given by:

$$R_i(x) = \frac{D_{i0}(x)}{D_{i0}(x) + S_{i0}(x)} \quad \text{(Equation 1)}$$

where $D_{i0}$=digital count at x of the ith diluted ink before modification, i=0 for cyan and i=1 for magenta; $S_{i0}$=digital count at x of the ith saturated ink before modification; and $R_i$=ratio of the ith diluted ink to the total of the ith saturated and ith diluted ink at x before modification.

At step S104-3, a new 3-D diluted ink ratio is determined so as to optimize the initial usage of diluted ink in the initial colorant space to generate a final usage of diluted ink for use in the final colorant space.

As set forth previously, the initial colorant space is constructed by the 1-D lookup tables (mixing tables). Therefore, in the initial colorant space, the diluted ink ratio of a colorant at any mixing point will be equal to the corresponding primary diluted ink ratio. For example, the diluted ink ratio of cyan at ($x_0$, $x_1$, $x_2$) will be equal to the primary diluted ink ratio of cyan at ($x_0$, 0, 0). As mentioned above, the usage of diluted ink determined this way is too much for some subsets in the 3-D initial colorant space. Accordingly, it is desirable to compute a new 3-D diluted ink ratio ($F_i$) such that the new diluted ink ($D_i$) at each color mixing point in the initial colorant space is given by $$D_i = F_i(D_{i0} + S_{i0}) \text{ Or} \quad \text{(Equation 2)}$$

$$F_i = \frac{D_i}{D_{i0} + S_{i0}} \quad \text{(Equation 3)}$$

where $D_{i0}$ and $S_{i0}$ are the original diluted and saturated ink digital counts of cyan or magenta at the mixing point.

It is reasonable to assume that the 3-D diluted ink ratio, $F_i$, increases with the primary diluted ink ratio ($R_i$) of the mixing point, and that 3-D diluted ink ratio should be related to some variable, V, which depends on all of the primary diluted ink ratios within the same color mixing point (e.g., $R_0$ for cyan, and $R_1$ for magenta). The 3-D diluted ink ratio, $F_i$, is thus assumed to take the following form:

$$F_i=[V(R_0,R_1)R_i]^{\lambda} \quad \text{(Equation 4)}$$

where λ is a constant. To determine the 3-D diluted ink ratio ($F_i$) function, the following two considerations are made:

(1) According to the first consideration, inspecting the 1-D lookup tables $D_i(x)$ and $S_i(x)$ shows that as the color becomes darker (x increases), the primary diluted ink ratio approaches zero. When this darker color (e.g., cyan at a larger $x_0$) is mixed with another lighter color (e.g., magenta at smaller $x_1$), the lighter color should not use much diluted ink since the mixed color is already "dark". Accordingly, let $$\xi=\max(x_0,x_1,\ldots,x_{n-1}) \quad \text{(Equation 5)}$$

where n is the number of primary colors that have diluted levels at a mixing point, n=2 for a mixing point with two inks (e.g., cyan and magenta) which both have diluted levels; and n=1 for any mixing point on the cyan or magenta axis. Accordingly, based the present consideration, in conjunction with Equations 4 and 5, the variable, V, may be determined as a function of $R_0$ and $R_1$, as follows:

$$V(R_0,R_1)=\frac{1}{n}\sum_{j=0}^{n-1}R_j(\xi) \quad \text{(Equation 6)}$$

An example of $R_j(x)$ is provided as follows: at $x_0$=200 (cyan index) and $x_1$=100 (magenta index), x will be 200, $R_0(200)$ will be the primary diluted cyan ratio at x=200, computed with Eq. 1, and $R_1(200)$ will be the primary diluted magenta ratio at x=200 (not x=100), computed with Equation 1. Selecting x according to Equation 5 will make the diluted ink ratio of the darkest colorant (after middle tone color, the darker color will have less diluted ink; see FIGS. 9 and 10) in the mixing point play an important role, leading to a smaller $F_i$ (Equations. 4 and 6), and hence less diluted ink (Equation 2) for the darker image area than that determined in step S102-3 for the initial colorant space. With the present example in mind, it is seen that the initial usage of diluted ink is reduced at particular points in the initial colorant space in order to generate a final usage of diluted ink for use in the final colorant space.

(2) According to the second consideration, it is understood that Equation 4 is a general function and should satisfy the following boundary condition: On the primary cyan (or magenta) axis, the diluted ink determined in step S102-3 should not be modified. This means by comparing Equations 1 and 3 that the new 3-D diluted ink ratio should be equal to the primary diluted ink ratio under conditions appropriate to the second consideration (e.g., those points on the primary cyan and magenta axes). Hence, on the primary cyan (or magenta) axis, based on Equations 4 and 6:

$$R_i=[R_iR_i]^{\lambda} \quad \text{(Equation 7)}$$

Solving the above equation gives $$\lambda=\frac{1}{2} \quad \text{(Equation 8)}$$

By combining Equations 4, 6, and 8, the new 3-D diluted ink ratio, $F_i$, is given by:

$$F_i=\sqrt{\frac{R_i}{n}\sum_{j=0}^{n-1}R_j(\xi)} \quad \text{(Equation 9)}$$

Equations 2 and 9 are applied to all mixing points in the initial colorant space in order to determine the final usage of diluted ink, which will be used to form the final colorant space.

At step S104-5, the initial usage of saturated ink is modified, e.g., optimized, to generate the final usage of saturated ink, based on the final usage of diluted ink.

After the diluted ink is reduced from $D_{i0}$ to $D_i$ (Equation 2), the saturated ink in the color mixing point is modified to maintain the original colorfulness. One rigorous way to do this is to determine the new saturated inks by making the new L*a*b* equal to the original values, which could be done by using a color mixing model. However, for computational efficiency, making the new L* approximately equal to the original value by the following method has proved to be a reasonable approximation. Let:

$L^*_d(D)$=the diluted ink L* profile, where D is diluted ink digital count (0-255);

$L^*_s(S)$=the saturated ink L* profile, where S is saturated ink digital count (0-255).

$L^*_{s\text{-}1}(L^*s)$=the inverted function of the saturated ink L* profile, wherein the output is saturated ink digital count (0-255).

$L^*d_{i0}$=the L* value of diluted ink before modification when $D=D_{i0}$, where i=0 for cyan and i=1 for magenta;

$L^*_{di}$=the L* value of diluted ink after modification when $D=D_i$;

$L^*_{si0}$=the L* value of saturated ink before modification when $S=S_{i0}$;

$L^*_{si}$=the L* value of saturated ink after modification when $S=S_i$.

Then, equalizing the L* change due to the diluted ink reduction to the L* change due to the saturated ink increase gives (note that the L* decreases with increasing digital count):

$$L^*_{si}=L^*_{si0}-(L^*_{di}-L^*_{di0}) \quad \text{(Equation 10)}$$

Inverting the 1-D function $L^*_s(S)$ gives the modified saturated ink ($S_i$):

$$S_i=L^{*}_{s}{}^{-1}(L^*_{si}) \quad \text{(Equation 11)}$$

Using Equations 1, 2, 5, 9, 10, and 11, the digital counts of a color that has a diluted level in a color mixing point will be modified for the entire initial colorant space, yielding a modified colorant space.

At step S104-7, the final colorant space is formed based on the final usage of diluted ink and final usage of saturated ink.

After the initial colorant space is modified as set forth above, a black ink mixing technique, such as that described in U.S. Pat. No. 6,776,473 B2, assigned Lexmark International, Inc. of Lexington, Ky., is used to mix the black ink (K) into the modified colorant space. Each color mixing point in the colorant space will now contain 6 digital counts: (C, M, Y, K, c, m). This colorant space is referred to as the final colorant space.

An example of generating a colorant point in the final colorant space in accordance with the present embodiment follows.

(1) Input variables:

a. 1-D lookup tables: cyan: $D_0(x_0)$, $S_0(x_0)$; magenta: $D_1(x_1)$, $S_1(x_1)$; yellow: $S_2(x_2)$.

b. 1-D L* profiles: cyan: $L^*_{d0}(D_0)$, $L^*_{s0}(S_0)$; magenta: $L^*_{d1}(D_1)$, $L^*_{s1}(S_1)$.

c. $x_0=255$, $x_1=127$, $x_2=10$.

(2) Find the color mixing point at $(x_0, x_1, x_2)$ from the 1-D lookup tables: CMYcm: (255, 0, 5, 0, 200), i.e., $S_{00}=255$, $S_{10}=0$, $S_{20}=5$, $D_{00}=0$, $D_{10}=200$.

(3) Compute the primary diluted ink ratios: cyan: $R_0(x_0)=0/(0+255)=0$, magenta: $R_1(x_1)=200/(200+0)=1$.

(4) Find the maximum value of $x_i$ for colors that have diluted levels: $>=\max(x_0, x_1)=\max(255, 127)=255$.

(5) Compute primary diluted ink ratios at $x=>$: since $>=255$ is 100% saturated ink point, all diluted inks are zero. Therefore, cyan: $R_0(>)=0$, magenta: $R_1(>)=0$.

(6) Compute new 3-D diluted ink ratios: from Equation 9, $F_0=0$ for cyan, and $F_1=0$ for magenta.

(7) Modify diluted inks: from Equation (2), $D_0=0$ for cyan, and $D_1=0$ for magenta.

(8) Find L* values for $D_{i0}$, $S_{i0}$, and $D_i$: these values can be found from the 1-D L* profiles. Here the diluted cyan in the example point is zero and no modification is necessary. Only L* values for magenta must be found, based on:

$L^*_{d10}=L^*_{d1}(D_{10})=L^*_{d1}(200)=67.0$ $L^*_{s10}=L^*_{s1}(S_{10})=L^*_{s1}(0)=93.0$ $L^*_{d1}=L^*_{d1}(D_1)=L^*_{d1}(0)=93.0$ (9) Compute the L* values of new saturated inks (for magenta only, in the present example):

From Equation (10):

$L^*_{s1}=L^*_{s10}-(L^*_{d1}-L^*_{d10})=93.0-(93.0-67.0)=67.0$

(10) Compute new saturated inks (for magenta only, in the present example): suppose $L^*_{s1}(75)=67.0$, then from Equation 1, $S_1=75$;

The above example has modified the original point (255, 0, 5, 0, 200) into (255, 75, 5, 0, 0), giving an ink reduction of 27%.

From the above, it will be appreciated by those skilled in the art that optimizing the initial usage of the diluted ink and the initial usage of the saturated ink in the initial colorant space yields a reduction in usage of the diluted ink and an increase in usage of the saturated ink in the final colorant space as compared to the initial colorant space. As set forth below, it is the final colorant space that is incorporated into color conversion lookup table 62. The reduction in usage of the diluted ink and the increase in usage of the saturated ink occurs exclusively at darker portions of an image printed by imaging apparatus 12 using color conversion lookup table 62.

For example, when printing colors that use small amounts of diluted cyan and/or diluted magenta, e.g., digital counts less than 40, not very much ink is ejected onto substrate 44 to reproduce such relatively light colors, and hence, there is no need to reduce the amount of diluted ink, since at such low amounts of usage, visual artifacts are unlikely. Hence a lower limit is set, below which, the amount of diluted ink will not be reduced, whereas for colors that are darker than the limit, the amount of diluted ink usage in the initial colorant space will be reduced. The lower limit may be set to any value above which a reduction in diluted ink is required in order to reduce visual artifacts, and may be made higher or lower than 40, which is merely an exemplary value. For example, the lower limit may be set at the mid-tone level of 8-bit color, which is 128. In such a case, there would be no reduction in usage of diluted ink in lighter portions of the picture, e.g., those portions having digital counts of less than 128, but in the darker portions of the image, e.g., those portions having digital counts greater than or equal to 128, there would be a reduction in usage of the diluted ink.

The amount of reduction in usage of the diluted ink increases with increasing darkness within an image printed by imaging apparatus 12 using color conversion lookup table 62, and the amount of increase in usage of the saturated ink increases with the increasing darkness, as may be appreciated by those skilled in the art based on the aforementioned discussion of the present embodiment.

Figure 13A:
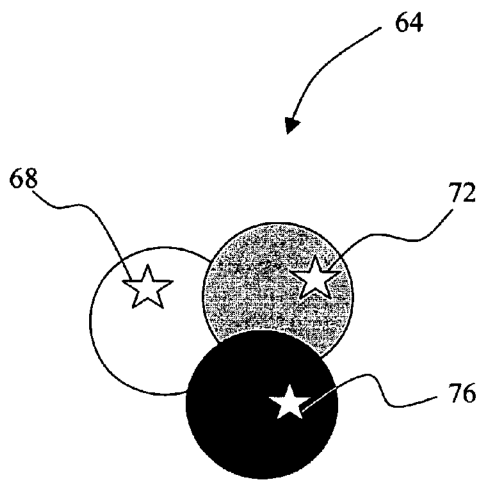
FIGS. 13A and 13B are an image and a corresponding lightness/darkness scale used in illustrating a reduction of usage of diluted ink in accordance with the embodiment of FIG. 3.
Figure 13B:
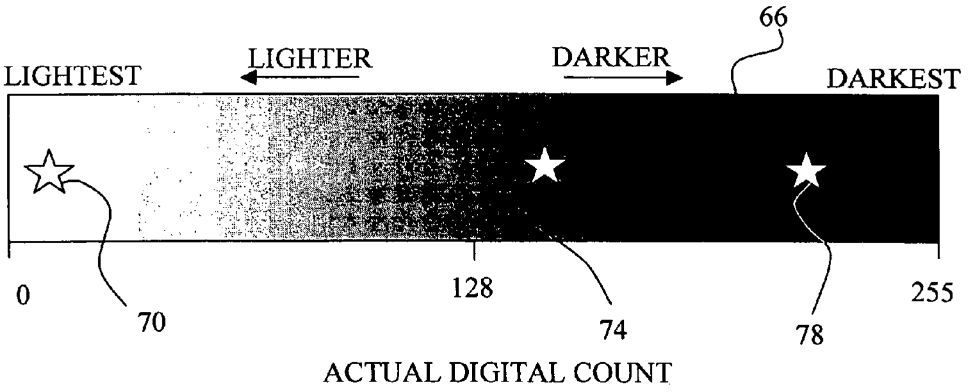

For example, referring now to FIGS. 13A and 13B, an image 64 and a corresponding lightness/darkness scale 66, respectively, are depicted. Lightness/darkness scale 66 illustrates the range of lightness, L*, of image 64. Location pointer 68 in image 64, represented by a "star", indicates a relatively light portion of image 64, as is visually apparent in FIG. 13A, and which is indicated in lightness/darkness scale 66 of FIG. 13B by location pointer 70. Because this portion of the image is relatively light, no reduction in usage of diluted ink is required. Location pointer 72 in FIG. 13A, on the other hand, is seen in a darker portion of image 64 than is location pointer 68, as indicated by location pointer 74 on lightness/darkness scale 66 of FIG. 13B, where a reduction in usage of diluted inks is likely warranted. Location pointer 76 is in a still darker portion of image 64 than is location pointer 72, as indicated by location pointer 78 on lightness/darkness scale 66 in FIG. 13B, wherein a greater amount of reduction of usage of diluted ink occurs than at the portion of image 64 indicated by location pointer 72.

It will also be appreciated by those skilled in the art that based on the above method steps, the reduction in usage of the diluted ink is greater in magnitude than the increase in usage of the saturated ink, such that a total usage of the diluted ink and the saturated ink as expressed in the final colorant space is less than a total usage of the diluted ink and the saturated ink as expressed in the initial colorant space. Thus, less ink overall is ejected onto substrate 44, reducing the likelihood of paper cockling, soak-thru, mottling, and smearing.

Although both FIGS. 13A and 13B are in the form of grayscale images, it will be appreciated by those skilled in the art that FIGS. 13A and 13B are used for illustrative purposes, and that the present description applies equally to color images, for example, 8-bit color images, wherein the digital count for each level/color varies on a scale of 0 to 255.

Figure 14:
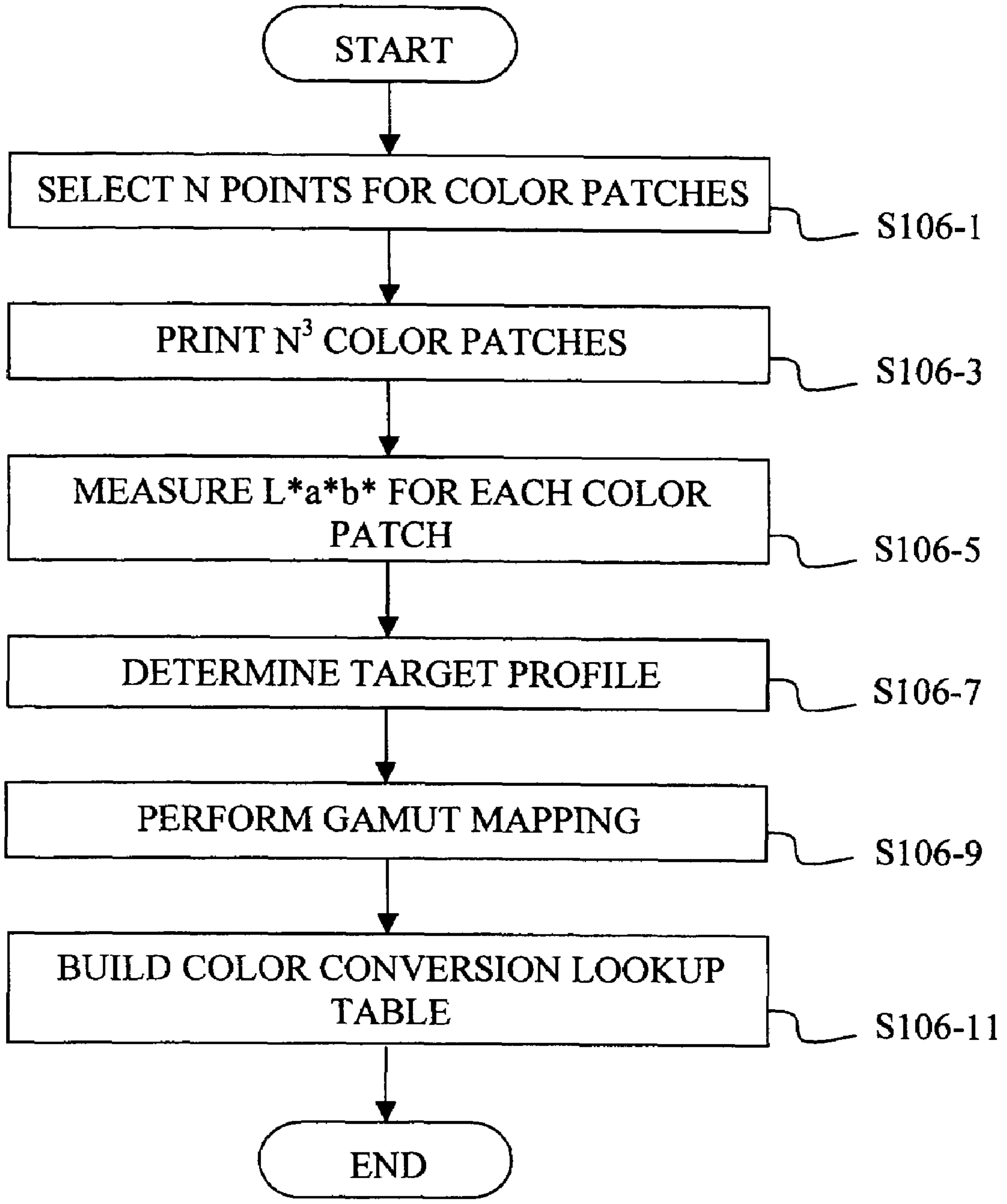
FIG. 14 is a flowchart that depicts a method of generating a color conversion lookup table in accordance with the embodiment of FIG. 3.

Referring now to FIG. 14, the generation of color conversion lookup table 62 based on the final colorant space, as set forth in step S106 of FIG. 3, is described in greater detail below with respect to steps S106-1 to S106-11.

Any calibration and color table building procedures for the 3-color (CMY) printing can be easily applied to the final colorant space. In the present embodiment, the three variables $(x_0, x_1, x_2)$ are treated as three nominal inks which are analogues to (C, M, Y) variables of 3-color printing. The difference is that each combination of the C, M, and Y variables contains only three inks (C,M,Y), whereas each combination of the $x_0$, $x_1$, and $x_2$ variables contains six inks (C,M,Y,K,c,m). A procedure for generating color conversion lookup table 62 is accordingly described below.

At step S106-1, N (e.g., N=9) evenly-spaced points are selected for each of the three variables $(x_0, x_1, x_2)$, forming a total of $N^3$ (e.g., $9^3=729$) combinations. Each combination of the $x_0$, $x_1$, and $x_2$ variables will contain six inks (C,M,Y,K,c,m) in the final colorant space.

At step S106-3, $N^3$ color patches are printed using the $N^3$ combination points.

At step S106-5, the L*, a*, b* values for each color patch are measured, for example, using a spectrophotometer. This provides a data set correlating the $N^3$ colorant points ($x_0$, $x_1$, $x_2$) with a corresponding $N^3$ points (L*, a*, b*) in device-independent color space. Using a three-dimensional interpolation method with respect to ($x_0$, $x_1$, $x_2$), the L*, a*, b* values can be computed for each color mixing point of the final colorant space. Each mixing point ($x_0$, $x_1$, $x_2$) is associated with the pre-determined six inks, and the relationship between (C,M,Y,K,c,m) and (L*, a*, b*) is established, which is called a printer profile.

At step S106-7, a target profile is determined. If the main application of imaging apparatus 12 is to reproduce the monitor-displayed images, the monitor profile is selected as the target profile. In the target profile, the relationship between monitor (R,G,B) (Red, Green, and Blue colors) and (L*,a*, b*) is established.

At step S106-9, gamut mapping is performed. Since the color ranges that can be produced are different between the monitor and imaging apparatus 12, mapping the color ranges between the two devices is necessary, and may be performed using techniques known in the art.

At step S106-11, color conversion lookup table 62 is built based on the results of the gamut mapping between the monitor and the final colorant space of imaging apparatus 12. The transformation from one colorant space to another colorant space is usually performed using a color table, such as color conversion lookup table 62. For color reproduction from monitor input values to imaging apparatus 12 CMYKcm color values, the input to color conversion lookup table 62 is (R, G, B) and the output of color conversion lookup table 62 is (C,M,Y,K,c,m). In building the color conversion lookup table 62, Q (e.g., Q=17) even-spaced points for each of the R, G, and B colors are selected, giving a total of $Q^3$ (e.g., $17^3$=4913) combinations. The color values (L*, a*, b*) for each combination are then found from the monitor profile. Inverting the printer profile and using the color values as input will give the corresponding printer colorant values (C,M,Y, K,c,m). When imaging apparatus 12 and/or imaging driver 58 receives R, G, and B color values for an image, it will lookup (or interpolate) the corresponding C, M, Y, K, c, m values in color conversion lookup table 62 for reproducing the image.

While this invention has been described with respect to exemplary embodiments, it will be recognized that the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of selecting inks for use in imaging with an imaging apparatus, said method comprising:

determining a maximum usage of a diluted ink for use in conjunction with a saturated ink based on visual perception characteristics relating to a combination of said diluted ink and said saturated ink;

generating an initial colorant space based on said maximum usage of said diluted ink, said initial colorant space expressing an initial usage of said diluted ink and an initial usage of said saturated ink at each point in said initial colorant space;

optimizing said initial usage of said diluted ink and said initial usage of said saturated ink in said initial colorant space to generate a final usage of said diluted ink and a final usage of said saturated ink in a final colorant space; and generating a color conversion lookup table based on said final colorant space.

2. The method of claim 1, further comprising:

printing a plurality of color patches on a substrate using said diluted ink and said saturated ink; and determining at least one of granularity, gloss, and a substrate ink tolerance, based on said plurality of color patches, wherein said visual perception characteristics are determined based on said at least one of said granularity, said gloss, and said substrate ink tolerance.

3. The method of claim 2, wherein:

said determining said at least one of said granularity, said gloss, and said substrate ink tolerance is determining at least two of said granularity, said gloss, and said substrate ink tolerance; and said determining said maximum usage of said diluted ink is selecting a lowest maximum usage of said diluted ink as individually determined based on each of said at least two of said granularity, said gloss, and said substrate ink tolerance.

4. The method of claim 1, further comprising generating mixing tables to determine both said initial usage of said diluted ink and said initial usage of said saturated ink based on said maximum usage of said diluted ink, wherein said initial colorant space is generated based on said initial usage of said diluted ink and said initial usage of said saturated ink.

5. The method of claim 1, wherein said optimizing said initial usage of said diluted ink and said initial usage of said saturated ink in said initial colorant space yields a reduction in usage of said diluted ink and an increase in usage of said saturated ink in said final colorant space as compared to said initial colorant space.

6. The method of claim 5, wherein said reduction in usage of said diluted ink and said increase in usage of said saturated ink occurs exclusively at darker portions of an image printed by said imaging apparatus using said color conversion lookup table.

7. The method of claim 5, wherein an amount of said reduction in usage of said diluted ink increases with increasing darkness within an image printed by said imaging apparatus using said color conversion lookup table, and an amount of said increase in usage of said saturated ink increases with said increasing darkness.

8. The method of claim 5, wherein said reduction in usage of said diluted ink is greater in magnitude than said increase in usage of said saturated ink such that a total usage of said diluted ink and said saturated ink as expressed in said final colorant space is less than a total usage of said diluted ink and said saturated ink as expressed in said initial colorant space.

9. The method of claim 1, wherein said diluted ink is one of a pigment-based ink and a dye-based ink, and wherein said saturated ink is the other of said pigment-based ink and said dye-based ink.

10. A method of selecting inks for use in imaging with an imaging apparatus, said method comprising:

printing a plurality of color patches on a substrate using a diluted ink and a saturated ink;

determining at least two of granularity, gloss, and a substrate ink tolerance, based on said plurality of color patches;

determining a maximum usage of said diluted ink for use in conjunction with said saturated ink based on visual perception characteristics relating to a combination of said diluted ink and said saturated ink, wherein said visual perception characteristics are based on said at least two of said granularity, said gloss, and said substrate ink tolerance;

generating an initial colorant space based on said maximum usage of said diluted ink, said initial colorant space expressing an initial usage of said diluted ink and an initial usage of said saturated ink at each point in said initial colorant space; and generating a color conversion lookup table based in part on said initial colorant space.

11. The method of claim 10, wherein said determining said maximum usage of said diluted ink is selecting a lowest maximum usage of said diluted ink as individually determined based on each of said at least two of said granularity, said gloss, and said substrate ink tolerance.

12. The method of claim 10, further comprising:

generating mixing tables to determine both said initial usage of said diluted ink and said initial usage of said saturated ink based on said maximum usage of said diluted ink, wherein said initial colorant space is generated based on said initial usage of said diluted ink and said initial usage of said saturated ink.

13. The method of claim 10, wherein said diluted ink is one of a pigment-based ink and a dye-based ink, and wherein said saturated ink is the other of said pigment-based ink and said dye-based ink.

14. A method of selecting inks for use in imaging with an imaging apparatus, said method comprising:

generating an initial colorant space, said initial colorant space expressing an initial usage of said diluted ink and an initial usage of said saturated ink at each point in said initial colorant space;

optimizing said initial usage of said diluted ink and said initial usage of said saturated ink in said initial colorant space to generate a final usage of said diluted ink and a final usage of said saturated ink in a final colorant space; and generating a color conversion lookup table based on said final colorant space.

15. The method of claim 14, wherein said optimizing said initial usage of said diluted ink and said initial usage of said saturated ink in said initial colorant space yields a reduction in usage of said diluted ink and an increase in usage of said saturated ink in said final colorant space as compared to said initial colorant space.

16. The method of claim 15, wherein said reduction in usage of said diluted ink and said increase in usage of said saturated ink occurs exclusively at darker portions of an image printed by said imaging apparatus using said color conversion lookup table.

17. The method of claim 15, wherein an amount of said reduction in usage of said diluted ink increases with increasing darkness within an image printed by said imaging apparatus using said color conversion lookup table, and an amount of said increase in usage of said saturated ink increases with said increasing image darkness.

18. The method of claim 15, wherein said reduction in usage of said diluted ink is greater in magnitude than said increase in usage of said saturated ink such that a total usage of said diluted ink and said saturated ink as expressed in said final colorant space is less than a total usage of said diluted ink and said saturated ink as expressed in said initial colorant space.

19. The method of claim 14, wherein said diluted ink is one of a pigment-based ink and a dye-based ink, and wherein said saturated ink is the other of said pigment-based ink and said dye-based ink.

* * * * *